United States Patent
Momo et al.

(10) Patent No.: US 12,353,820 B2
(45) Date of Patent: Jul. 8, 2025

(54) READING COMPREHENSION SUPPORT SYSTEM AND READING COMPREHENSION SUPPORT METHOD

(71) Applicant: Semiconductor Energy Laboratory Co., Ltd., Atsugi (JP)

(72) Inventors: Junpei Momo, Sagamihara (JP); Natsuko Takase, Isehara (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 7 days.

(21) Appl. No.: 18/031,392

(22) PCT Filed: Oct. 15, 2021

(86) PCT No.: PCT/IB2021/059488
§ 371 (c)(1),
(2) Date: Apr. 12, 2023

(87) PCT Pub. No.: WO2022/090849
PCT Pub. Date: May 5, 2022

(65) Prior Publication Data
US 2024/0012979 A1    Jan. 11, 2024

(30) Foreign Application Priority Data
Oct. 30, 2020    (JP) .................. 2020-182488

(51) Int. Cl.
*G06F 40/103*    (2020.01)
*G06F 16/901*    (2019.01)
(Continued)

(52) U.S. Cl.
CPC ........ *G06F 40/103* (2020.01); *G06F 16/9024* (2019.01); *G06F 16/9038* (2019.01);
(Continued)

(58) Field of Classification Search
CPC ........ G06F 40/103; G06F 40/30; G06F 16/93; G06F 16/3344; G06F 16/9038; G06F 16/9024; G06F 40/289; G06F 16/345
See application file for complete search history.

(56) References Cited

U.S. PATENT DOCUMENTS 6,356,911 B1 *   3/2002   Shibuya .............. G01C 21/3446
                                                      707/999.005
2005/0149494 A1 *  7/2005   Lindh .................. G06F 16/289
(Continued)

FOREIGN PATENT DOCUMENTS

JP    11-015830 A     1/1999
JP    2004-348555 A   12/2004
(Continued)

OTHER PUBLICATIONS

International Search Report (Application No. PCT/IB2021/059488) Dated Dec. 28, 2021.
(Continued)

*Primary Examiner* — Wilson W Tsui
(74) *Attorney, Agent, or Firm* — Eric J. Robinson; Robinson Intellectual Property Law Office, P.C.

(57) ABSTRACT

A document reading comprehension support system which presents information necessary for a user with high accuracy is provided. A reading comprehension support system which receives a designated document; creates a first graph representing a structure of the designated document with words or phrases contained in the designated document; outputs two or more words or phrases contained in the first graph; receives a plurality of designated words or phrases from the output words or phrases; searches the first graph with the plurality of designated words or phrases; and outputs a search result, is provided. As the search result, at least a second graph representing a shortest path between any two of the plurality of designated words or phrases in the first
(Continued)

graph can be output. The shortest path is a path connecting any two of the plurality of designated words or phrases through at least one complementary word or phrase. The complementary word or phrase is a word or phrase different from the plurality of designated words or phrases.

21 Claims, 9 Drawing Sheets

(51) Int. Cl.
    *G06F 16/9038*     (2019.01)
    *G06F 16/93*     (2019.01)
    *G06F 40/289*     (2020.01)
    *G06T 11/20*     (2006.01)

(52) U.S. Cl.
    CPC ............ *G06F 16/93* (2019.01); *G06F 40/289* (2020.01); *G06T 11/206* (2013.01)

(56) References Cited

U.S. PATENT DOCUMENTS

| | | | | |
|---|---|---|---|---|
| 2008/0091408 A1* | 4/2008 | Roulland | ............. | G06F 40/211 707/E17.074 |
| 2009/0024385 A1* | 1/2009 | Hirsch | ................. | G06F 40/205 704/E13.011 |
| 2011/0238409 A1* | 9/2011 | Larcheveque | ...... | G10L 15/1815 704/239 |
| 2012/0158639 A1* | 6/2012 | Moore | ................. | G06F 16/282 706/55 |
| 2014/0180677 A1* | 6/2014 | McCaffrey | ............ | G06F 40/247 704/9 |
| 2018/0081861 A1* | 3/2018 | Danielyan | ............. | G06F 40/295 |
| 2019/0122042 A1* | 4/2019 | Sunagawa | ............... | G06F 18/22 |
| 2020/0349222 A1* | 11/2020 | Kadambi | .............. | G06F 40/216 |

FOREIGN PATENT DOCUMENTS

| | | | |
|---|---|---|---|
| JP | 2014-219833 A | 11/2014 |
| JP | 2017-187898 A | 10/2017 |

OTHER PUBLICATIONS

Written Opinion (Application No. PCT/IB2021/059488) Dated Dec. 28, 2021 .

* cited by examiner

A semiconductor device comprising:
an oxide semiconductor layer over an insulator layer.

A semiconductor device comprising
an oxide semiconductor layer over an insulator layer.

FIG. 4C 331 332 333 334

| A | semiconductor | device | comprising |

| an | oxide | semiconductor | layer | over | an | insulator | layer |

| A semiconductor device | comprising |

| an oxide semiconductor layer | over | an insulator layer |

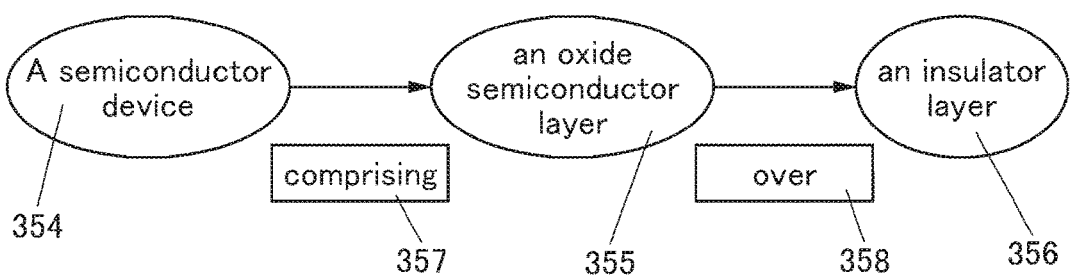

READING COMPREHENSION SUPPORT SYSTEM AND READING COMPREHENSION SUPPORT METHOD

TECHNICAL FIELD

One embodiment of the present invention relates to a document reading comprehension support system and a reading comprehension support method.

Note that one embodiment of the present invention is not limited to the above technical field. Examples of the technical field of one embodiment of the present invention include a semiconductor device, a display device, a light-emitting device, a power storage device, a memory device, an electronic device, a lighting device, an input device (e.g., a touch sensor), an input/output device (e.g., a touch panel), a method for driving any of them, and a method for manufacturing any of them.

BACKGROUND ART

When a document is read and comprehended, how the document is read depends on the reader's purpose or the type of the document. The reader may read through the entire document in some cases; in other cases, the purpose of reading may be finding information that the reader needs, in which cases it is sufficient for the reader if he/she finds the related part containing the necessary information from the document and reads only the related part. As a method for finding necessary information from a document, a table of contents or an index can be used. For a computerized document, a search with a keyword may be done to find desired information. In addition, a method of structurally analyzing a document in accordance with a set rule has been proposed (Patent Document 1).

REFERENCE

Patent Document

[Patent Document 1] Japanese Published Patent Application No. 2014-219833

SUMMARY OF THE INVENTION

Problems to be Solved by the Invention

In the case where a table of contents or an index is used, if the word to be found is not used directly in the table of contents or the index, the efficiency is low. Text search with a keyword enables a sentence or a paragraph that includes the keyword to be found from the entire document; however, desired information may not always be found efficiently. The reasons for not being able to find desired information efficiently are, for example: the keyword search gets so many hits that it takes too much time to reach the desired information, a single keyword is unable to narrow down the desired information, an appropriate keyword cannot be found, and the like. Furthermore, the document structural analysis in accordance with rules limits the structure of the subjects to be read, so that a document with a variety of structures is difficult to handle. One embodiment of the present invention solves at least one of the above problems.

An object of one embodiment of the present invention is to provide a document reading comprehension support system or a document reading comprehension support method, which presents information necessary for a user with high accuracy. An object of one embodiment of the present invention is to provide a reading comprehension support system or a reading comprehension support method, which supports user's comprehension of a document. An object of one embodiment of the present invention is to provide a document reading comprehension support system or a document reading comprehension support method, which can be operated easily by a user.

Note that the description of these objects does not preclude the existence of other objects. One embodiment of the present invention does not need to achieve all of these objects. Other objects can be derived from the description of the specification, the drawings, and the claims.

Means for Solving the Problems

One embodiment of the present invention is a reading comprehension support system including a reception portion, a processing portion, and an output portion. The reception portion has a function of receiving a designated document and a function of receiving a plurality of designated words or phrases. The processing portion has a function of creating a first graph representing a structure of the designated document with words or phrases contained in the designated document and a function of searching the first graph with the plurality of designated words or phrases. The output portion has a function of outputting a plurality of words or phrases contained in the first graph and a function of outputting a search result of the first graph. The plurality of designated words or phrases is at least part of the plurality of words or phrases contained in the first graph.

The output portion preferably outputs, as the search result, at least a second graph representing a shortest path between any two of the plurality of designated words or phrases in the first graph. The output portion preferably has a function of outputting a sentence containing the designated word or phrase in a paragraph containing two or more of the plurality of designated words or phrases in the designated document. The shortest path is preferably a path connecting any two of the plurality of designated words or phrases through at least one complementary word or phrase, and the complementary word or phrase is preferably a word or phrase different from the plurality of designated words or phrases. The output portion preferably has a function of outputting a sentence containing at least one of the designated word or phrase and the complementary word or phrase in a paragraph containing at least one of the plurality of designated words or phrases and at least one of the complementary words or phrases in the designated document.

Alternatively, the output portion preferably outputs, as the search result, at least a second graph representing shortest paths between the plurality of designated words or phrases in the first graph. The output portion preferably has a function of outputting a sentence containing the designated word or phrase in a paragraph containing two or more of the plurality of designated words or phrases in the designated document. The shortest paths connecting any two of the plurality of designated words or phrases are preferably paths connecting the two designated words or phrases through at least one complementary word or phrase, and the complementary word or phrase is preferably a word or phrase different from the plurality of designated words or phrases. The output portion preferably has a function of outputting a sentence containing at least one of the designated word or phrase and the complementary word or phrase in a paragraph containing at least one of the plurality of designated words or phrases and at least one of the complementary words or phrases in the designated document.

The reading comprehension support system of one embodiment of the present invention preferably further includes a storage portion storing the search result.

One embodiment of the present invention is a reading comprehension support method including: receiving a designated document; creating a first graph representing a structure of the designated document with words or phrases contained in the designated document; outputting two or more words or phrases contained in the first graph; receiving a plurality of designated words or phrases from the output words or phrases; and searching the first graph with the plurality of designated words or phrases and outputting a search result.

As the search result, at least a second graph representing a shortest path between any two of the plurality of designated words or phrases in the first graph is preferably output. A sentence containing the designated word or phrase in a paragraph containing two or more of the plurality of designated words or phrases in the designated document is preferably output together with the search result. The shortest path is preferably a path connecting any two of the plurality of designated words or phrases through at least one complementary word or phrase, and the complementary word or phrase is preferably a word or phrase different from the plurality of designated words or phrases. A sentence containing at least one of the designated word or phrase and the complementary word or phrase in a paragraph containing at least one of the plurality of designated words or phrases and at least one of the complementary words or phrases in the designated document is preferably output together with the search result.

Alternatively, as the search result, at least a second graph representing shortest paths between the plurality of designated words or phrases in the first graph is preferably output. A sentence containing the designated word or phrase in a paragraph containing two or more of the plurality of designated words or phrases in the designated document is preferably output together with the search result. The shortest paths connecting any two of the plurality of designated words or phrases are preferably paths connecting the two designated words or phrases through at least one complementary word or phrase, and the complementary word or phrase is preferably a word or phrase different from the plurality of designated words or phrases. A sentence containing at least one of the designated word or phrase and the complementary word or phrase in a paragraph containing at least one of the plurality of designated words or phrases and at least one of the complementary words or phrases in the designated document is preferably output together with the search result.

Effect of the Invention

With one embodiment of the present invention, a document reading comprehension support system or a document reading comprehension support method, which presents information necessary for a user with high accuracy, can be provided. With one embodiment of the present invention, a reading comprehension support system or a reading comprehension support method, which supports user's comprehension of a document, can be provided. With one embodiment of the present invention, a document reading comprehension support system or a document reading comprehension support method, which can be operated easily by a user, can be provided.

Note that the description of these effects does not preclude the existence of other effects. One embodiment of the present invention does not need to have all of these effects. Other effects can be derived from the description of the specification, the drawings, and the claims.

BRIEF DESCRIPTION OF THE DRAWINGS

FIG. 4A to FIG. 4E are diagrams illustrating an example of a reading comprehension support method.

MODE FOR CARRYING OUT THE INVENTION

Figure 1:
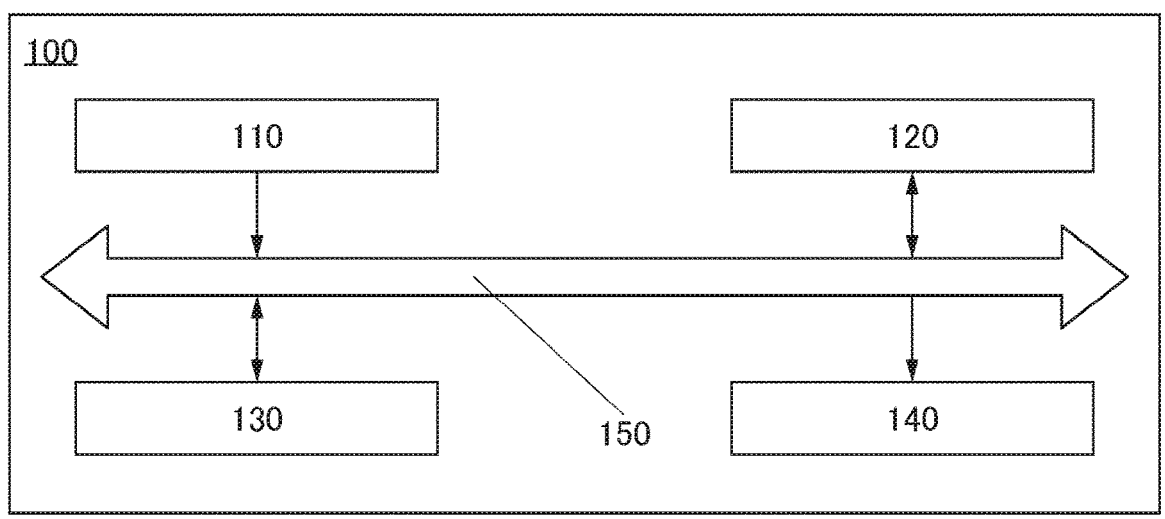
FIG. 1 is a diagram illustrating an example of a reading comprehension support system.

Embodiments are described in detail with reference to the drawings. Note that the present invention is not limited to the following description, and it will be readily appreciated by those skilled in the art that modes and details of the present invention can be modified in various ways without departing from the spirit and scope of the present invention. Therefore, the present invention should not be construed as being limited to the description in the following embodiments.

Note that in structures of the invention described below, the same portions or portions having similar functions are denoted by the same reference numerals in different drawings, and the description thereof is not repeated. Furthermore, the same hatch pattern is used for the portions having similar functions, and the portions are not especially denoted by reference numerals in some cases.

The position, size, range, or the like of each component illustrated in drawings does not represent the actual position, size, range, or the like in some cases for easy understanding. Therefore, the disclosed invention is not necessarily limited to the position, size, range, or the like disclosed in the drawings.

Note that the term "film" and the term "layer" can be interchanged with each other depending on the case or circumstances. For example, the term "conductive layer" can be replaced with the term "conductive film." As another example, the term "insulating film" can be replaced with the term "insulating layer."

Embodiment 1

In this embodiment, a reading comprehension support system and a reading comprehension support method of one embodiment of the present invention are described with reference to FIG. 1 to FIG. 7.

In the reading comprehension support system of one embodiment of the present invention, a designated document is received, a first graph representing a structure of the designated document is created with words or phrases contained in the designated document, and two or more words or phrases contained in the first graph are output. A plurality of designated words or phrases are received from the output words or phrases, the first graph is searched with the plurality of designated words or phrases, and a search result is output. Note that in this specification and the like, a graph can also be referred to as a graph structure.

In creation of the first graph, words or phrases that exist in close proximity to each other in the document can be directly connected. For example, in the case where two words or phrases exist in the same sentence, the two words or phrases can be directly connected. Furthermore, in the case where two words or phrases exist in the same paragraph, for example, the two words or phrases can be directly connected. Regarding two words or phrases, in the case where a sentence containing one of the words or phrases exists in close proximity to a sentence containing the other word or phrase (for example, where the two words or phrases exist within n sentences before and after (n is an integer of 1 or more)), for example, the two words or phrases can be directly connected. Words or phrases in close proximity to each other in a document are connected in this manner, so that a graph representing a structure of the document can be created. The thus created graph can represent the relatedness between the words or phrases in the document.

A user of the reading comprehension support system designates a document that the user wants to read and comprehend as the designated document. The user further designates a plurality of keywords related to information the user wants to obtain as the designated words or phrases.

Here, in the case where a keyword search is simply performed in the document, the reader is required to select keywords used for the search in consideration of synonyms of the keywords, fluctuations in expression, and the like. Thus, it is hard for the reader to select the keywords, and a difference in users' skills is likely to occur in the keyword selection. In contrast, in the reading comprehension support system of one embodiment of the present invention, after the designated document is received and the first graph is created, words or phrases contained in the first graph are output; thus, the user of the reading comprehension support system can select keywords from the output words or phrases. This facilitates keyword selection, making the difference in users' skills unlikely to occur and allowing necessary information to be found quickly from the document.

Furthermore, even when the reader selects the plurality of keywords, the keywords are scattered in the document and the relation between the plurality of selected keywords is hard to comprehend in some cases. For example, even when the locations of a plurality of keywords are referred to using the index of a book, the contents are not connected in some cases. In such cases, more time is spent in searching and reading and comprehension (e.g., adding a keyword or reading descriptions between the plurality of pages that have been referred to).

The reading comprehension support system of one embodiment of the present invention searches the first graph with the received plurality of designated words or phrases and thus can output a second graph representing the relatedness between the plurality of designated words or phrases. Thus, the user can easily grasp the relatedness between the designated words or phrases. The reading comprehension support system of one embodiment of the present invention can extract and output a sentence containing the plurality of designated words or phrases designated by the user. The user can efficiently obtain necessary information by reading the extracted sentence.

The reading comprehension support system of one embodiment of the present invention can present a shortest path between the plurality of designated words or phrases in the first graph. For example, the second graph representing the shortest path is output, so that the relatedness between the plurality of designated words or phrases can be presented to the user.

For example, there is a case where another designated word or phrase is contained in a shortest path between a first designated word or phrase and a second designated word or phrase. The user can grasp the relatedness between the plurality of designated words or phrases and comprehend the document more deeply.

In some cases, a complementary word or phrase which is a word or phrase different from the plurality of designated words or phrases is contained in the shortest path. Presenting the complementary word or phrase that is not designated by the user in this manner can promote the grasp and comprehension of the contents of the document. The user can comprehend the document more deeply by grasping the complementary word or phrase itself and the relatedness between the complementary word or phrase and the designated words or phrases. The complementary word or phrase is a word or phrase that is contained in the designated document (i.e., a word or phrase contained in the first graph) and different from the designated words or phrases.

The reading comprehension support system of one embodiment of the present invention can output a sentence containing the designated words or phrases in the designated document together with the second graph. At this time, the reading comprehension support system can output all the sentences containing any of the designated words or phrases, for example. However, some designated words or phrases may cause too many sentences to be output, in which case it takes much time for the user to reach information the user wants.

Thus, the reading comprehension support system of one embodiment of the present invention preferably extracts a sentence from the document on the basis of each shortest path and outputs it.

For example, a sentence containing the designated word or phrase in a paragraph containing two or more of the plurality of designated words or phrases in the designated document can be output. Furthermore, for example, a sentence containing at least one of the designated word or phrase and the complementary word or phrase in a paragraph containing at least one of the plurality of designated words or phrases and at least one of the complementary words or phrases in the designated document can be output.

This allows the user to efficiently confirm a sentence necessary for grasping the relatedness between the plurality of designated words or phrases. Then, necessary information can be obtained quickly.

The reading comprehension support system of one embodiment of the present invention presents at least the shortest path between any two of the plurality of designated words or phrases. In other words, the reading comprehension support system of one embodiment of the present invention may present shortest paths between some of the designated words or phrases or shortest paths between all the designated words or phrases.

For example, in some cases, two designated words or phrases are not connected even via another word or phrase and a path cannot be shown. For example, a criterion for judging the level of the relatedness between two designated words or phrases may be established, and in the case where the system judges that the relatedness between two designated words or phrases is high, the system may present the shortest path between the two designated words or phrases.

Specifically, in the case where two designated words or phrases are connected via less than or equal to a predetermined number of words or phrases in the shortest path, it can be judged that the relatedness between the two designated words or phrases is high. Conversely, in the case where two designated words or phrases are connected via more than a predetermined number of words or phrases in the shortest path, it can be judged that the relatedness between the two designated words or phrases is low.

The reading comprehension support system of one embodiment of the present invention can be used for document proofreading as well. For example, in some cases, a word or phrase that is isolated and not connected to the other designated words or phrases can be found from designated words or phrases. In that case, the reading comprehension support system of one embodiment of the present invention may output the word or phrase that is not connected to the other designated words or phrases as an isolated word or phrase. Furthermore, in some cases, contents of the output graph are different from what is expected; e.g., designated words or phrases that are related to each other are not connected. In this case, the document can contain an error or omission in writing or the like. Thus, the reading comprehension support system of one embodiment of the present invention can be used to efficiently review the document.

The reading comprehension support system of one embodiment of the present invention can also be used to grasp one or both of the relatedness and difference between a plurality of documents. For example, for a plurality of designated documents, the reading comprehension support system of one embodiment of the present invention can create the first graphs each of which represents the structure of the designated document with words or phrases contained in the designated document, search each of the first graphs, and output search results. A user can easily confirm the relatedness and the difference between the plurality of documents by comparing the output results.

The reading comprehension support system of one embodiment of the present invention may have a function of comparing search results of a plurality of documents and presenting at least one of the relatedness and the difference. For example, the reading comprehension support system of one embodiment of the present invention can create, as the search results, graphs representing the shortest path between designated words or phrases for each document. The graphs are vectorized and the degree of similarity between the vectors is calculated, whereby the degree of similarity between the plurality of documents can be evaluated.

In this case, two or more words or phrases may be output from each of the first graphs, and designated words or phrases may be received on the designated document basis. A designated word or phrase common to all the designated documents may be received. Note that in the case where a synonym of a word or phrase contained in a designated document exists in another designated document, these words or phrases are preferably linked with each other. In the case where "insulating film" and "insulating layer" are linked and "insulating film" is selected as a designated word or phrase, a graph of a designated document may be searched for "insulating film," and a graph of a different designated document may be searched for "insulating layer," for example.

<Reading Comprehension Support System 1>

FIG. 1 illustrates a block diagram of a reading comprehension support system 100. The reading comprehension support system 100 includes a reception portion 110, a storage portion 120, a processing portion 130, an output portion 140, and a transmission path 150.

The reading comprehension support system 100 may be provided in an information processing device such as a personal computer used by a user. Alternatively, a processing portion of the reading comprehension support system 100 may be provided in a server to be accessed by a client PC via a network and used.

[Reception Portion 110]

The reception portion 110 receives a designated document. Furthermore, the reception portion receives designated words or phrases. Data supplied to the reception portion 110 is supplied to one or both of the storage portion 120 and the processing portion 130 through the transmission path 150.

In this specification and the like, a document means a description of a phenomenon in natural language, which is computerized and machine-readable, unless otherwise described. Examples of a document include patent applications, legal precedents, contracts, terms and conditions, product manuals, novels, publications, white papers, and technical documents, but not limited thereto.

[Storage Portion 120]

The storage portion 120 has a function of storing a program executed by the processing portion 130. The storage portion 120 preferably has a function of storing a graph generated by the processing portion 130. It is desired that the graph be linked with a document so as to find which document the graph is created from. The storage portion 120 may have a function of storing a calculation result and an inference result generated by the processing portion 130, data input to the reception portion 110, and the like.

The storage portion 120 includes at least one of a volatile memory and a nonvolatile memory. As the volatile memory, a DRAM (Dynamic Random Access Memory), an SRAM (Static Random Access Memory), and the like can be given. As the nonvolatile memory, an ReRAM (Resistive Random Access Memory, also referred to as a resistance-change memory), a PRAM (Phase-change Random Access Memory), an FeRAM (Ferroelectric Random Access Memory), an MRAM (Magnetoresistive Random Access Memory, also referred to as a magnetoresistive memory), a flash memory, and the like can be given. The storage portion 120 may include a storage media drive. As the storage media drive, a hard disk drive (HDD), a solid state drive (SSD), or the like can be given.

The storage portion 120 may include a database containing document data.

The reading comprehension support system 100 may have a function of extracting document data from a database existing outside the system. For example, the reading comprehension support system may have a function of extracting data from a database existing outside the system.

The reading comprehension support system 100 may have a function of extracting data from both its own database and a database existing outside the system.

The database can have a structure containing either or both of text data and image data, for example.

One or both of a storage and a file server may be used instead of the database. For example, in the case where a file contained in a file server is used, the database preferably contains a path for the file stored in the file server.

An application database can be given as an example of the database. Examples of the application include applications relating to intellectual properties, such as a patent application, an application for utility model registration, and an application for design registration. There is no limitation on each status of the applications, i.e., whether or not it is published, whether or not it is pending in the Patent Office, and whether or not it is registered. For example, the application database can contain at least one of applications before examination, applications under examination, and registered applications, or may contain all of them.

For example, the application database preferably contains one or both of specifications and scopes of claims for a plurality of patent applications. The specifications and scopes of claims are stored in text data, for example.

The application database may contain at least one of an application management number for identifying the application (including a number for internal use), an application family management number for identifying the application family, an application number, a publication number, a registration number, a drawing, an abstract, an application date, a priority date, a publication date, a status, a classification (e.g., patent classification or utility model classification), category, a keyword, and the like. These pieces of information may each be used to identify a document when a designated document is received. Alternatively, these pieces of information may each be output together with a processing result of the processing portion 130.

Furthermore, various documents such as a book, a journal, a newspaper, and a paper can be managed with the database. The database contains at least text data of documents. The database may contain at least one of an identification number of each document, the title, the date of issue or the like, the author name, the publisher name, and the like. These pieces of information may each be used to identify a document when a designated document is received. Alternatively, these pieces of information may each be output together with a processing result of the processing portion 130.

[Processing Portion 130]

The processing portion 130 has a function of performing processing such as calculation and inference with the use of data supplied from one or both of the reception portion 110 and the storage portion 120. The processing portion 130 has a function of performing processing with the use of various data contained in the database. The processing portion 130 can supply a processing result such as a calculation result or an inference result to one or both of the storage portion 120 and the output portion 140.

The processing portion 130 has a function of performing morphological analysis. In other words, the processing portion 130 has a function of dividing each sentence contained in a document into the smallest segments that each have a meaning in the language (also referred to as tokens, morphemes, words, or the like) and judging the part of speech of each token. Note that the processing of dividing each sentence into the smallest segments can also be referred to as lexical analysis.

The processing portion 130 preferably has a function of performing compound word analysis. In other words, the processing portion 130 preferably has a function of performing morphological analysis in consideration of a compound word (e.g., a compound noun). For example, the processing portion 130 preferably has a function of generating a new token whose part of speech is a compound noun (redefining a token) by combining some tokens in order to put together consecutive nouns in one sentence. Note that even when the part of speech of a token is a compound noun, the part of speech of the token is sometimes simply written as a noun.

Furthermore, the processing portion 130 preferably has a function of calculating the distance between tokens. For example, the processing portion 130 is preferably capable of obtaining information that two tokens are in the same sentence or in the same paragraph, for example. The processing portion 130 is preferably capable of calculating how far (i.e., how many paragraphs, sentences, words, or character strings) two tokens are apart from each other.

The processing portion 130 preferably has a function of obtaining a related term of each token. Examples of related term include a synonym, a hypernym, and a hyponym. The processing portion 130 preferably has a function of calculating the degree of similarity between tokens.

The related term can be obtained from a dictionary such as a concept dictionary, for example. The dictionary may be included in the reading comprehension support system or may be provided outside the system. The concept dictionary is a list to which the categories of words, relations with other words, and the like are added. The concept dictionary may be an existing concept dictionary. Alternatively, a concept dictionary tailored to the field of a document or the like may be created. Further alternatively, words that are often used in the field of a document may be added to a general-purpose concept dictionary.

Words or phrases may be vectorized (digitized), one or both of the degree of similarity and the distance between a plurality of words or phrases may be calculated, and a related term of a node may be obtained on the basis of the level of the degree of similarity or the closeness of the distance between the plurality of words or phrases.

As a method for obtaining the degree of similarity between two vectors, cosine similarity, the covariance, the unbiased covariance, the Pearson product-moment correlation coefficient, and the like can be given. Among them, cosine similarity is particularly preferably used.

As a method for obtaining the distance between two vectors, Euclidean distance, Standard (standardized, average) Euclidean distance, Mahalanobis distance, Manhattan distance, Chebyshev distance, Minkowski distance, and the like can be given.

For example, a distributed representation vector of a word or phrase is preferably generated with machine learning. A distributed representation vector of a word or phrase is further preferably generated with the use of a neural network. Specifically, the related term is preferably extracted using a distributed representation vector obtained by machine learning of the distributed representation of words or phrases contained in a designated document. Alternatively, the related term is preferably extracted using a distributed representation vector obtained by machine learning of the distributed representation of words or phrases contained in a group of documents contained in a database or the like.

The processing portion 130 may have a function of calculating the appearance frequency of each token. For example, a TF (Term Frequency) value of each token is preferably calculated. The TF value can represent the appearance frequency of each token in a designated document.

The processing portion 130 may have a function of calculating the importance of tokens. It is preferable to calculate a TF-IDF (Term Frequency-Inverse Document Frequency) value of each token, for example. The IDF value refers to the degree of concentrative appearance of a token in a few documents. The IDF value of a token that appears in many documents is low, and the IDF value of a token that appears only in a few documents is high. For example, the IDF value of a token is preferably calculated using documents contained in a database. Calculating the product of the TF value and the IDF value of each token can provide a score indicating whether the token characterizes a designated document.

The processing portion 130 has a function of creating a graph representing a document structure with words or phrases contained in a document.

The graph includes a node (vertex) and an edge (side). The node and the edge can each have a label. As the label of the node, the above-described token can be used. For example, a token whose part of speech is a noun (including a compound noun) can be used as the label of the node. As the label of the edge, one or both of the distance between the above-described tokens and the related term of the tokens can be used.

As the graph, either of a directed graph using an edge that has a direction and an undirected graph using an edge that does not have a direction may be created.

A plurality of nodes are connected by an edge. A single edge or a plurality of edges may be present between two nodes. In a displayed graph, one or both of a straight line and a curved line can be used to express the edge.

Furthermore, the structure of one document may be represented by a plurality of graphs. For example, the structure of one document may be represented using both a directed graph and an undirected graph.

The edge that does not have a direction preferably connects two nodes in a document so that the relation between the two nodes can be comprehended. The conditions of connecting the nodes are, for example, connecting the nodes in the same sentence with an edge, connecting the nodes in the same paragraph with an edge, and connecting the nodes in a predetermined distance (e.g., a certain number of words or a certain number of characters) with an edge.

In the case of creating a directed graph, the processing portion 130 preferably has a function of performing syntactic analysis. In other words, the processing portion 130 preferably has a function of dividing each sentence contained in a document into tokens, determining the part of speech of the tokens, and determining the dependency of the tokens. Note that part of processing included in the syntactic analysis can also be referred to as the above-described lexical analysis or morphological analysis. By the syntactic analysis, the direction of dependency can be indicated by an arrow in a directed graph.

In creating a directed graph, an edge may be directed from a node that appears earlier to a node that appears later, for example. The edge direction may be determined on the basis of the dependency relation obtained by the syntactic analysis, the relation between a hypernym and a hyponym, the level of the appearance frequency, or the level of the importance of a word.

The graph may be created from the dependency relation between tokens, on the basis of a rule. Furthermore, the graph may be created using a model that has performed learning with machine learning. For example, conditional random field (CRF) may be used to perform machine learning in which nodes and edges are labeled on the basis of a list of tokens. Thus, the nodes and edges can be labeled on the basis of the list of tokens. Furthermore, learning with a Seq2Seq model, in which a list of tokens is input and nodes and directions of edges are output, may be performed using a recurrent neural network (RNN), long short-term memory (LSTM), or the like. Thus, the nodes and directions of edges can be output from the list of tokens.

Furthermore, the processing portion 130 has a function of searching a created graph. For example, the processing portion 130 can obtain the shortest path between a plurality of words or phrases. As a method for obtaining the shortest path, Dijkstra's algorithm, Bellman-Ford algorithm, Floyd-Warshall algorithm, and the like can be given. For example, a path including the smallest number of nodes (words or phrases) can be regarded as the shortest path.

The processing portion 130 has a function of creating a graph representing the shortest path between a plurality of designated words or phrases. The graph created by the processing portion 130 is output by the output portion 140.

The processing portion 130 preferably has a function of vectorizing a graph that is a search result (e.g., a graph representing the shortest path between a plurality of designated words or phrases). As a method for vectorizing a graph, a Weisfeiler-Lehman graph kernel and the like can be given.

The processing portion 130 preferably has a function of calculating the degree of similarity between vectors. Accordingly, graphs which are search results of a plurality of documents can be vectorized and the degree of similarity between the plurality of documents can be calculated.

Note that in obtaining the degree of similarity between a plurality of documents, using graphs created by abstraction of tokens enables the degree of similarity between a plurality of documents to be obtained with high accuracy, in some cases. By the abstraction of tokens, a document can be grasped conceptually. Thus, calculation of the degree of similarity based on the concept of a document is possible with less influence from the structure and expressions in the document.

In order that a user can read and comprehend a document accurately, it is preferable to present words or phrases used in the document as they are. For this purpose, the processing portion 130 may create both a graph created without abstraction of tokens for reading comprehension and a graph created with abstraction of tokens for calculation of the degree of similarity.

Note that abstraction of a token refers to replacement of the token by a representative word or a hypernym. To obtain a representative word and a hypernym, a concept dictionary may be used or classification by machine learning may be carried out. Abstraction of a token is performed by vectorizing the token with morphemes contained in the token to be classified by a classifier, for example. Note that an algorithm such as a decision tree, support-vector machines, random forests, or a multilayer perceptron may be used as the classifier. Specifically, "oxide semiconductor," "amorphous semiconductor," "silicon semiconductor," and "GaAs semiconductor" are preferably classified into "semiconductor." Furthermore, "oxide semiconductor layer," "oxide semiconductor film," "amorphous semiconductor layer," "amorphous semiconductor film," "silicon semiconductor layer," "silicon semiconductor film," "GaAs semiconductor layer," and "GaAs semiconductor film" are also preferably classified into "semiconductor."

The processing portion 130 can include an arithmetic circuit, for example. The processing portion 130 can include, for example, a central processing unit (CPU).

The processing portion 130 may include a microprocessor such as a DSP (Digital Signal Processor) or a GPU (Graphics Processing Unit). The microprocessor may be constructed with a PLD (Programmable Logic Device) such as an FPGA (Field Programmable Gate Array) or an FPAA (Field Programmable Analog Array). The processing portion 130 can interpret and execute instructions from programs with the use of a processor to process various kinds of data and control programs. The programs to be executed by the processor are stored in at least one of a memory region of the processor and the storage portion 120.

The processing portion 130 may include a main memory. The main memory includes at least one of a volatile memory such as a RAM (Random Access Memory) and a nonvolatile memory such as a ROM (Read Only Memory).

For example, a DRAM, an SRAM, or the like is used as the RAM, a virtual memory space is assigned in the RAM and utilized as a working space of the processing portion 130. An operating system, an application program, a program module, program data, a look-up table, and the like that are stored in the storage portion 120 are loaded into the RAM for execution. The data, program, and program module which are loaded into the RAM are each directly accessed and operated by the processing portion 130.

In the ROM, a BIOS (Basic Input/Output System), firmware, and the like for which rewriting is not needed can be stored. Examples of the ROM include a mask ROM, an OTPROM (One Time Programmable Read Only Memory), and an EPROM (Erasable Programmable Read Only Memory). Examples of the EPROM include a UV-EPROM (Ultra-Violet Erasable Programmable Read Only Memory) which can erase stored data by ultraviolet irradiation, an EEPROM (Electrically Erasable Programmable Read Only Memory), and a flash memory.

It is preferable to use artificial intelligence (AI) for at least part of processing of the reading comprehension support system.

It is particularly preferable to use an artificial neural network (ANN; hereinafter also simply referred to as neural network) for the reading comprehension support system. The neural network is obtained with a circuit (hardware) or a program (software).

In this specification and the like, a neural network refers to a general model that is modeled on a biological neural network, determines the connection strength of neurons by learning, and has the capability of solving problems. A neural network includes an input layer, intermediate layers (hidden layers), and an output layer.

In the description of the neural network in this specification and the like, to determine a connection strength of neurons (also referred to as weight coefficient) from the existing information is referred to as "learning" in some cases.

In this specification and the like, to draw a new conclusion from a neural network formed with the connection strength obtained by learning is referred to as "inference" in some cases.

[Output Portion 140]

The output portion 140 outputs information on the basis of a processing result of the processing portion 130. For example, one or both of a calculation result and an inference result in the processing portion 130 can be supplied to the outside of the reading comprehension support system 100. Furthermore, the output portion 140 can output various kinds of data contained in a database on the basis of a processing result of the processing portion 130. The output portion 140 can output information to a display, a speaker, or the like used by a user.

[Transmission Path 150]

The transmission path 150 has a function of transmitting data. Data transmission and reception among the reception portion 110, the storage portion 120, the processing portion 130, and the output portion 140 can be performed through the transmission path 150.

The reading comprehension support method in the reading comprehension support system of one embodiment of the present invention is described with reference to FIG. 2 to FIG. 7.

<Reading Comprehension Support Method>

Figure 2:
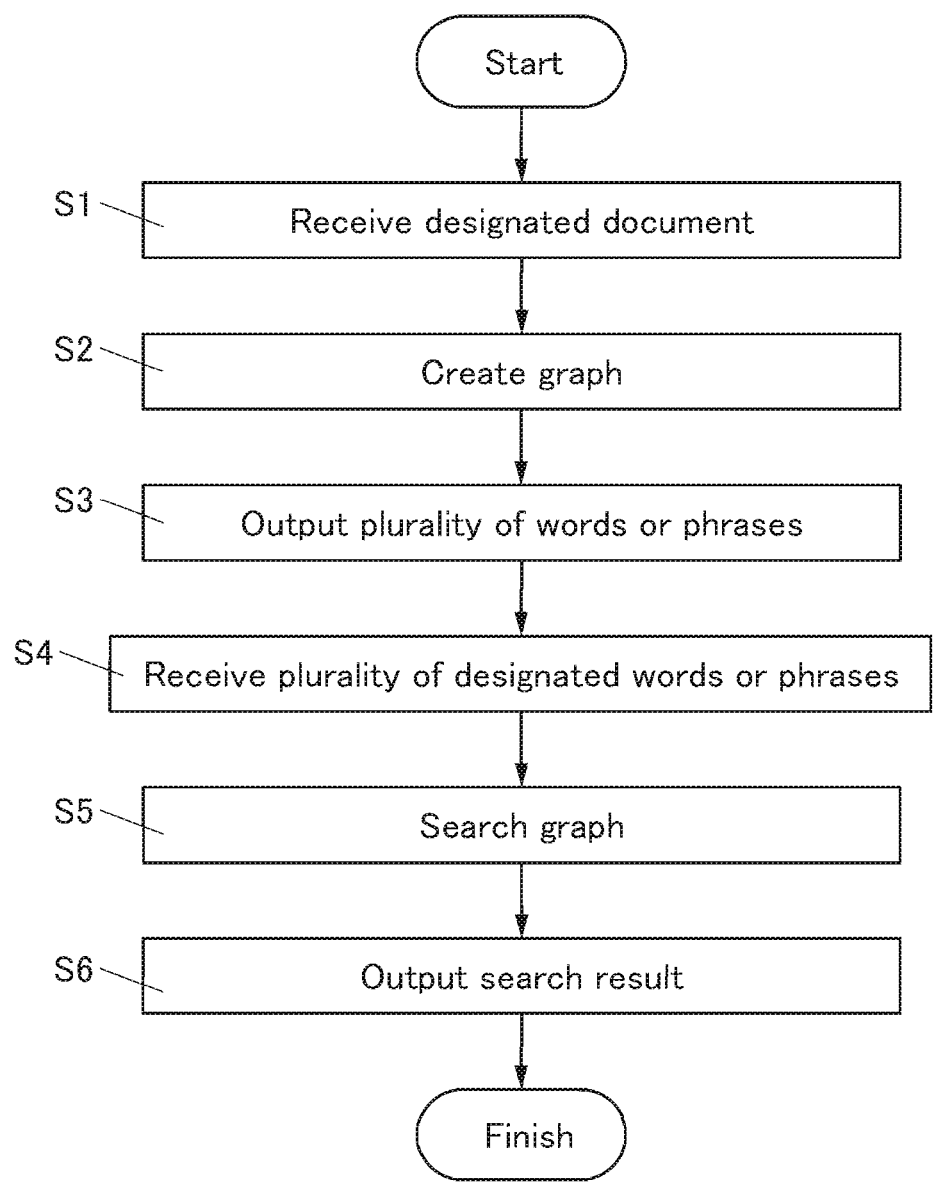
FIG. 2 is a diagram illustrating an example of a reading comprehension support method.

The reading comprehension support method of one embodiment of the present invention includes processing of Step S1 to Step S6 illustrated in FIG. 2.

[Step S1]

In Step S1, a designated document is received. The designated document is a document that a user wants to read and comprehend, for example. The number of designated documents may be one or more.

The user can directly input text data of the designated document. Image data of one or both of a drawing and a table contained in the designated document may be input together with the text data.

In the case where data of the designated document is data (audio data or image data) other than text data, the audio data or the image data is converted into text data before the process proceeds to Step S2.

In the case where the designated document is a document contained in a database or the like, the user can designate a document that the user wants to read and comprehend by inputting information that specifies the document (searching the database). The reading comprehension support system extracts data regarding the designated document (specifically, data necessary for the following processing) from the database or the like on the basis of the information input by the user. As the information that specifies the document, a document identification number, a title, and the like can be given.

Furthermore, in the case where the user wants to read and comprehend part of the designated document (e.g., a specific chapter), the user may designate part of the document.

[Step S2]

In Step S2, a graph representing a structure of the designated document is created with words or phrases contained in the designated document. In the case where a plurality of designated documents are designated, a graph is created for each of the designated documents. Furthermore, one or more graphs can be created for a single designated document.

In the case where an undirected graph is created, morphological analysis is performed on sentences contained in the designated document, first. Thus, each sentence is divided into tokens, and the part of speech of each token is determined.

In the case where a directed graph is created, syntactic analysis is performed on sentences contained in the designated document, first. Thus, each sentence is divided into tokens, the part of speech of each token is determined, and the dependency of each token is further determined.

In Step S2, compound word analysis is preferably performed. Specifically, after the parts of speech of the tokens are determined, some tokens are preferably combined to generate a new token. For example, consecutive nouns in a sentence are combined to one, so that a new token whose part of speech is a compound noun can be generated.

In creating a graph, for example, words or phrases that exist in close proximity to each other in a document can be directly connected. Each token is used as a label of a node, and nodes are connected with an edge. The conditions of connecting nodes with an edge can be determined as appropriate.

For example, nodes to be connected with an edge can be determined on the basis of the distance between tokens used as node labels in the document.

For example, in the case where two words or phrases exist in the same sentence, the two words or phrases can be directly connected. Furthermore, for example, in the case where two words or phrases exist in the same paragraph, the two words or phrases can be directly connected. Furthermore, for example, regarding two words or phrases, in the case where a sentence containing one of the words or phrases exists in close proximity to a sentence containing the other word or phrase (for example, where the two words or phrases exist within n sentences before and after (n is an integer of 1 or more, preferably more than or equal to 1 and less than or equal to 5, further preferably more than or equal to 3 and less than or equal to 5)), the two words or phrases can be directly connected.

In creating a directed graph, one or both of the appearance frequency and the importance of each token may be calculated in order to determine the edge direction.

In Step S2, one or both of information on the distance between tokens and information on the relatedness between tokens is preferably obtained.

When the graph is visualized, the obtained information on the distance between tokens and information on the relatedness between tokens can be displayed in characters as labels of edges. Alternatively, the color or thickness of edges may be determined in accordance with the distance. Alternatively, the color or thickness of edges may be determined in accordance with the relatedness.

For example, as the information on the distance between two tokens, whether the two tokens are in the same sentence or in the same paragraph, how far (i.e., how many paragraphs, sentences, words, or character strings) the two tokens are apart from each other, or the like can be registered as edge information.

For example, as the information on the relatedness between two words or phrases, information that one word or phrase is a related term of the other word or phrase, the relatedness between the two words or phrases, and the like can be written in an edge label. Examples of the related term include a synonym, a hypernym, and a hyponyms. Furthermore, another token in the sentence (a word or phrase such as a noun phrase, a verb phrase, and an adverbial phrase) that represents the relatedness between the two words or phrases can be registered as edge information.

An example of showing a Japanese sentence graphically is described with reference to FIG. 3A to FIG. 3D. Note that in FIG. 3A to FIG. 3D, a Japanese sentence and Roman alphabets corresponding to the Japanese sentence are illustrated.

Figure 3A:
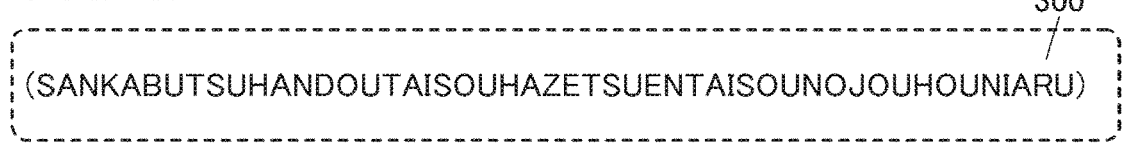
FIG. 3A to FIG. 3D are diagrams illustrating an example of a reading comprehension support method.

FIG. 3A illustrates a sentence 300 "SANKABUTSU-HANDOUTAISOUHAZETSUENTAISOUNOJOUHOU-NIARU."

In Step S2, the sentence 300 is subjected to morphological analysis, so that the sentence 300 is divided into a plurality of tokens and the parts of speech of the tokens are determined.

Figure 3B:
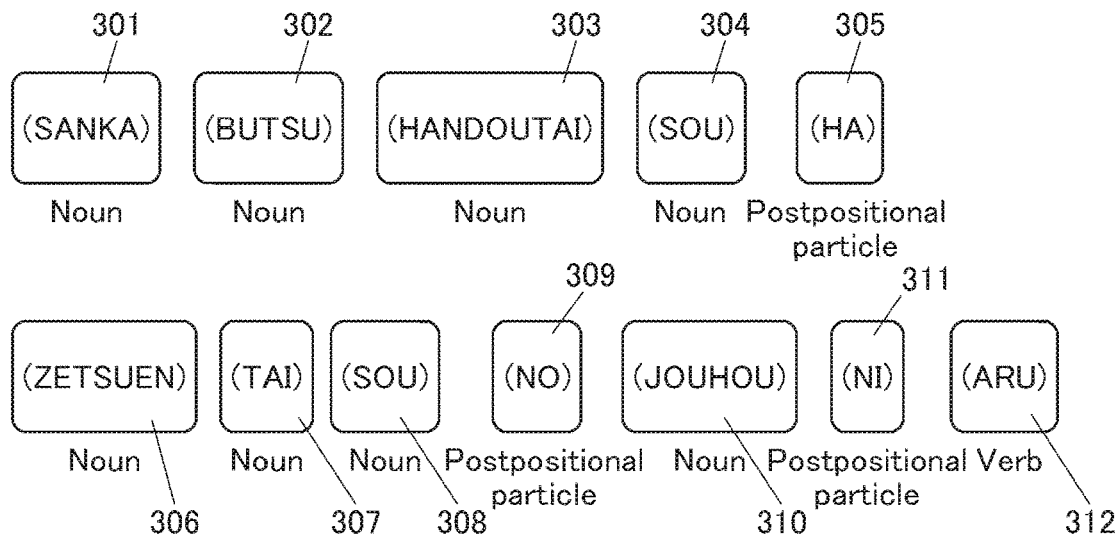

As illustrated in FIG. 3B, the sentence 300 is divided into twelve tokens, a token 301 to a token 312. Note that the part of speech is written under each token in FIG. 3B.

Then, compound word analysis is performed to combine consecutive nouns to one. Thus, as illustrated in FIG. 3C, the sentence 300 is composed of seven tokens.

Specifically, the character string of the token 301 illustrated in FIG. 3B is "SANKA," the character string of a token 302 is "BUTSU," the character string of a token 303 is "HANDOUTAI," and the character string of a token 304 is "SOU." The parts of speech of these tokens 301 to 304 are each a noun. Thus, they can be combined to one token 321 as illustrated in FIG. 3C. The character string of the token 321 is "SANKABUTSUHANDOUTAISOU," and the part of speech is a noun (compound noun).

Figure 3C:
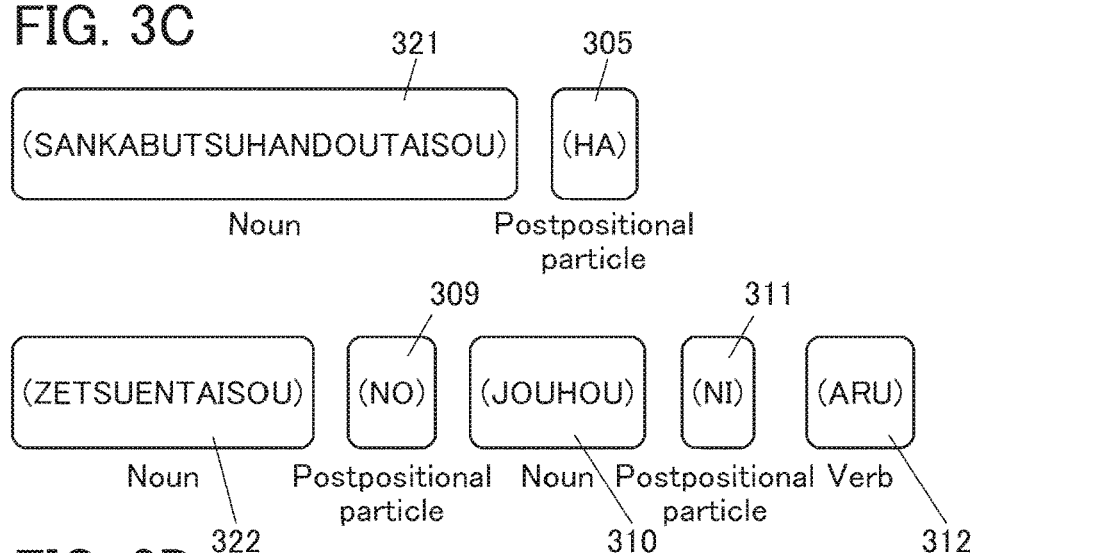

The character string of a token 305 illustrated in FIG. 3B and FIG. 3C is "HA," and the part of speech is a postpositional particle.

Furthermore, the character string of a token 306 illustrated in FIG. 3B is "ZETSUEN," the character string of a token 307 is "TAI," and the character string of a token 308 is "SOU." The parts of speech of these tokens 306 to 308 are each a noun. Thus, as illustrated in FIG. 3C, they are combined to one token 322. The character string of the token 322 is "ZETSUENTAISOU," and the part of speech is a noun (compound noun).

Moreover, the character string of a token 309 illustrated in FIG. 3B and FIG. 3C is "NO," and the part of speech is a postpositional particle. The character string of a token 310 is "JOUHOU," and the part of speech is a noun. The character string of a token 311 is "NI," and the part of speech is a postpositional particle. Furthermore, the character string of the token 312 is "ARU," and the part of speech is a verb.

Figure 3D:
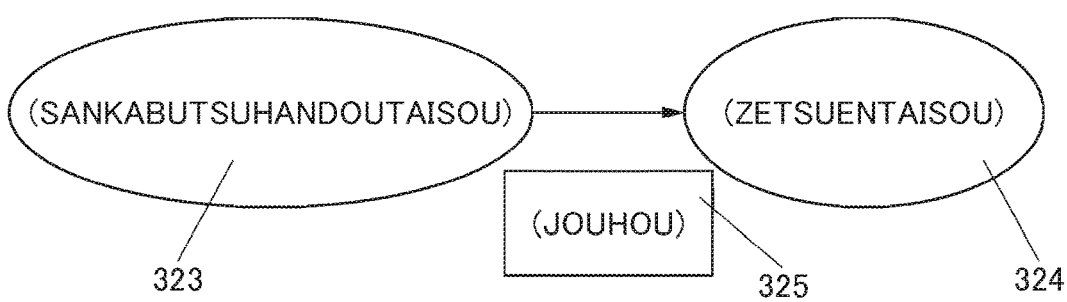

Next, in Step S2, the sentence 300 is graphically shown. FIG. 3D illustrates an example of the graphically shown sentence 300. Here, an example where the token 321 and the token 322 whose parts of speech are nouns are used as labels of a node 323 and a node 324 and the token 310 whose part of speech is a noun is used as a label 325 of an edge is illustrated. Note that at the label 325 of the edge, at least one of information on the distance between the nodes, information regarding the relatedness between the nodes, and the like may be shown instead of the token or in addition to the token.

An arrow illustrated in FIG. 3D is directed from the node 323 to the node 324. In other words, the starting point of the arrow is the token that appears earlier in the sentence 300, and the ending point of the arrow is the token that appears later. Note that the method for determining the arrow direction is not limited to this, and the above-described examples can be referred to. Depending on the case, the starting point of the arrow may be the node 324, and the ending point of the arrow may be the node 323. The method for determining the arrow direction is desirably consistent within the graph.

By performing the above-described processing on each sentence contained in the document, the structure of the whole document can be represented by one graph. As a result, one or both of the node 323 and the node 324 may be further connected to a word or phrase existing in another sentence with an edge. Note that part of a document may be represented by one graph. Alternatively, a graph may be created on a chapter basis of the document. In other words, a plurality of graphs may be created from one document.

An example of showing an English sentence graphically is described with reference to FIG. 4A to FIG. 4E.

FIG. 4A illustrates a sentence 330 "A semiconductor device comprising: an oxide semiconductor layer over an insulator layer."

In Step S2, it is preferable to perform document cleaning processing. The cleaning processing removes noise contained in the document. The cleaning processing includes, for example, deletion of semicolons, conversion of colons into commas, and the like. Performing the cleaning processing on the document can improve the accuracy of morphological analysis. By performing cleaning processing on the sentence 330, a semicolon can be deleted to obtain a sentence 330a as illustrated in FIG. 4B.

Next, the sentence 330a is subjected to morphological analysis, so that the sentence 330a is divided into a plurality of tokens. Although the parts of speech of tokens are not written in FIG. 4C, the part of speech of each token can be determined by the morphological analysis.

As illustrated in FIG. 4C, the sentence 330a is divided into twelve tokens, a token 331 to a token 342.

Then, compound word analysis is performed to combine consecutive nouns to one. Thus, as illustrated in FIG. 4D, the sentence 330a is composed of five tokens.

Specifically, the character string of the token 331 illustrated in FIG. 4C is "A," the character string of a token 332 is "semiconductor," and the character string of a token 333 is "device." The part of speech of the token 331 is an indefinite article, and the parts of speech of the token 332 and the token 333 are each a noun. Thus, they can be combined to one token 351 as illustrated in FIG. 4D. The character string of the token 351 is "A semiconductor device," and the part of speech is a noun (compound noun).

The character string of a token 334 illustrated in FIG. 4C and FIG. 4D is "comprising."

Furthermore, the character string of a token 335 illustrated in FIG. 4C is "an," the character string of a token 336 is "oxide," the character string of a token 337 is "semiconductor," and the character string of a token 338 is "layer." The part of speech of the token 335 is an indefinite article, and the parts of speech of the tokens 336 to 338 are each a noun. Thus, they can be combined to one token 352 as illustrated in FIG. 4D. The character string of the token 352 is "an oxide semiconductor layer," and the part of speech is a noun (compound noun).

The character string of a token 339 illustrated in FIG. 4C and FIG. 4D is "over."

The character string of a token 340 illustrated in FIG. 4C is "an," the character string of a token 341 is "insulator," and the character string of the token 342 is "layer." The part of speech of the token 340 is an indefinite article, and the parts of speech of the tokens 341 and 342 are each a noun. Thus, they can be combined to one token 353 as illustrated in FIG. 4D. The character string of the token 353 is "an insulator layer," and the part of speech is a noun (compound noun).

Next, in Step S2, the sentence 330 is graphically shown. FIG. 4E illustrates an example of the graphically shown sentence 330. Here, an example where the token 351 to the token 353 whose parts of speech are nouns are used as labels of a node 354 to a node 356, the token 334 is used as a label 357 of an edge between the node 354 and a node 355, and the token 339 is used as a label 358 of an edge between the node 355 and the node 356 is illustrated.

An arrow illustrated in FIG. 4E is directed from the node 354 to the node 355, and the other arrow is directed from the node 355 to the node 356. In other words, the starting points of the arrows are the tokens that appear earlier in the sentence 330, and the ending points of the arrows are the tokens that appear later.

In this embodiment, although the process of creating a graph from a document has been described taking the sentence using Japanese and the sentence using English as examples, the language of the document is not particularly limited. For example, from documents where languages such as Chinese, Korean, German, French, Russian, and Hindi are used, graphs can be created by taking steps similar to the above.

[Step S3]

In Step S3, a plurality of words or phrases contained in the graph is output.

The output method is not particularly limited, and a list of words or phrases can be displayed, for example. Alternatively, the graph itself created in Step S2 may be displayed. Alternatively, both the graph and the list may be displayed.

[Step S4]

In Step S4, a plurality of designated words or phrases is received.

The user selects a plurality of designated words or phrases among the plurality of words or phrases output in Step S3.

Table 1 shows an example where a list of the plurality of words or phrases is displayed in Step S3 and the user designates words or phrases in Step S4. The description will be given below by taking a case shown in Table 1 where two words or phrases, "layer A" and "layer B," are selected as the plurality of designated words or phrases as an example.

TABLE 1

| | |
|---|---|
| ✓ | layer A |
| ✓ | layer B |
| | layer C |
| | word D |
| | word E |
| | word F |
| | device G |
| | word H |
| | . |
| | . |
| | . |

[Step S5]

In Step S5, the graph is searched using the plurality of designated words or phrases received in Step S4.

Specifically, the shortest path between the plurality of designated words or phrases in the graph can be calculated in Step S5.

Figure 5A:
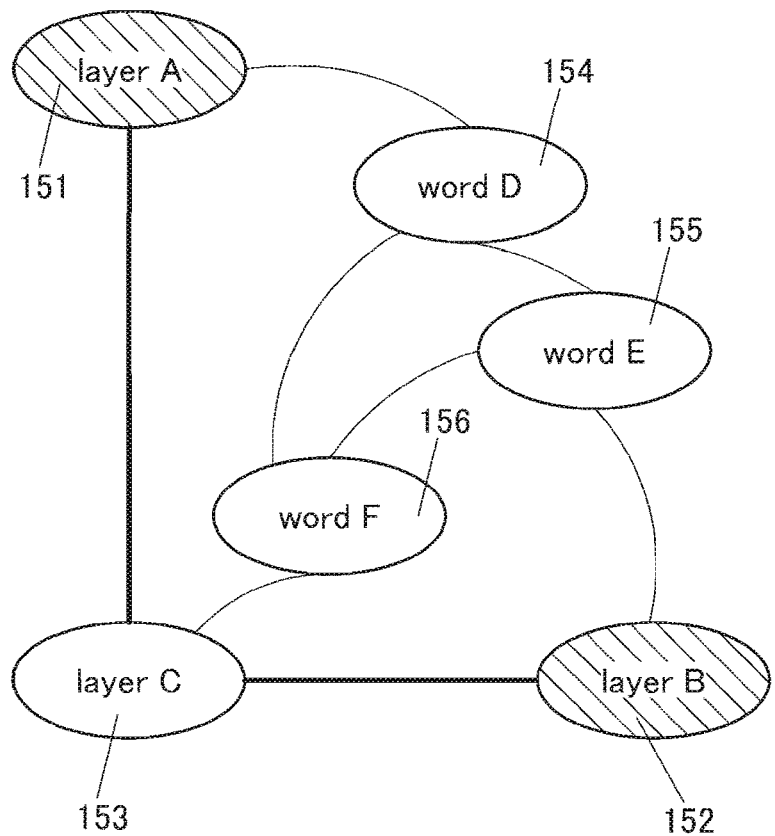
FIG. 5A to FIG. 5C are diagrams illustrating graph examples.

FIG. 5A illustrates an example where only a part related to "layer A" and "layer B" is extracted from the graph created in Step S2.

A graph illustrated in FIG. 5A includes a node 151 to a node 156. "layer A" is a label of the node 151, and "layer B" is a label of a node 152. In addition, a node 153 with a label "layer C," a node 154 with a label "word D," a node 155 with a label "word E," and the node 156 with a label "word F" are included in paths connecting the node 151 and the node 152.

Figure 5B:
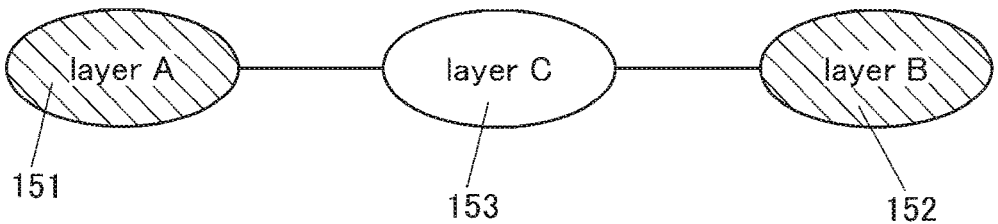
Figure 5C:
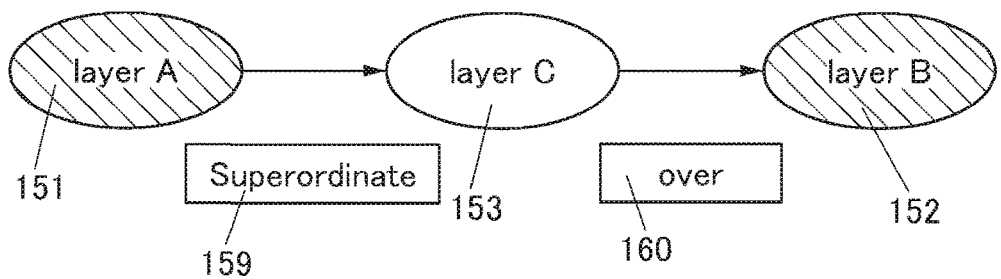
Figure 6:
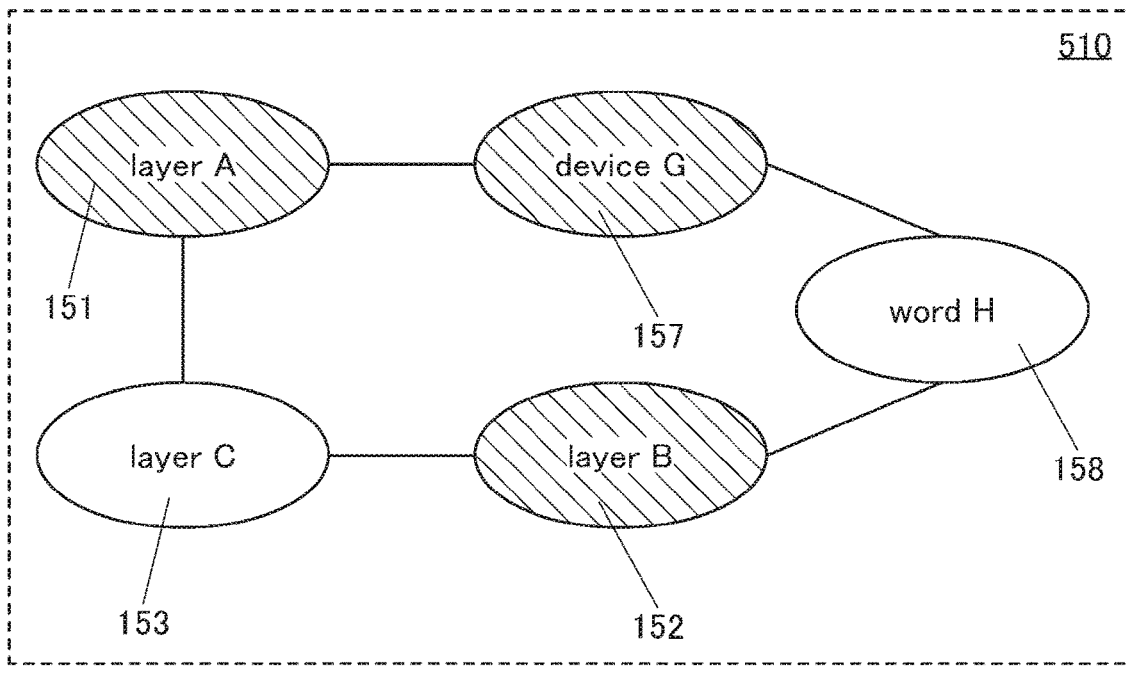
FIG. 6 is a diagram illustrating examples of output contents.
Figure 7:
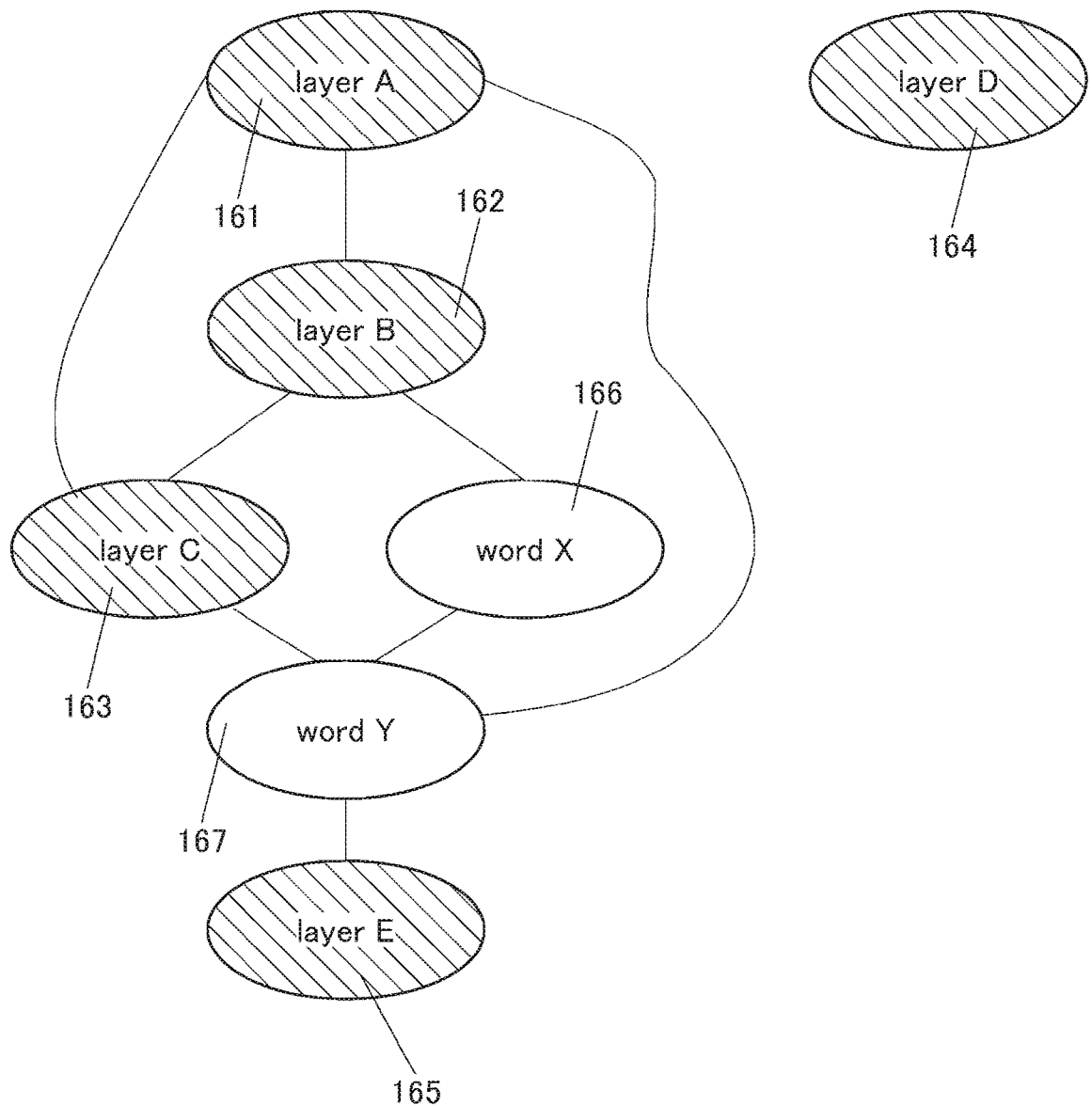
FIG. 7 is a diagram illustrating an example of a graph.

In FIG. 5 to FIG. 7, the nodes to which the designated words or phrases are given as labels are indicated by oblique hatching.

In the case where the necessary costs are the same no matter which edge is passed (where weights of edges are all the same), a path including the smallest number of nodes can be regarded as the shortest path. The shortest path connecting the node 151 and the node 152 in the graph illustrated in FIG. 5A is the path running through the node 153 with the label "layer C" (path indicated by a thick line in FIG. 5A). Thus, the shortest path between the plurality of designated words or phrases is calculated.

[Step S6]

In Step S6, a result of searching the graph in Step S5 is output.

FIG. 5B illustrates the shortest path connecting the node 151 and the node 152 in FIG. 5A. The graph illustrated in FIG. 5B is output, whereby the relatedness between "layer A" and "layer B" can be presented. In FIG. 5B, "layer A" and "layer B" are connected through a complementary word or phrase "layer C", which is a word or phrase different from the designated words or phrases; thus, a possibility of a strong relation of "layer C" to the information the user wants to grasp can be indicated to the user.

Information regarding the plurality of designated words or phrases can be further presented using at least one of the label, direction, color, and thickness of the edge.

FIG. 5C illustrates a directed graph obtained from the undirected graph illustrated in FIG. 5B. A label 159 is given to an edge between the node 151 and the node 153, and a label 160 is given to an edge between the node 153 and the node 152.

It is found from the label 159 shown in FIG. 5C that "layer A" is a hypernym of "layer C." A specific example of "layer A" is "semiconductor layer," and a specific example of "layer C" is "oxide semiconductor layer."

From the label 160 "over," it is found that "layer C" is positioned over "layer B." Thus, by using edge information, information regarding the designated words or phrases, which are illustrated in the nodes, can be presented to the user.

For the same graph search result in Step S5, the graph is not necessarily displayed in one way in Step S6. For example, the edge length, the node position depending on the edge length, and the like can be displayed in several different ways and are not particularly limited.

A sentence is preferably extracted from the document on the basis of each shortest path and output.

FIG. 6 illustrates examples of output contents. In the examples illustrated in FIG. 6, three words or phrases, "layer A," "layer B," and "device G," are selected as designated words or phrases.

A graph 510 illustrated in FIG. 6 contains the node 151 to the node 153, a node 157, and a node 158. "layer A" is the label of the node 151, "layer B" is the label of the node 152, and "device G" is a label of the node 157. In addition, the node 153 with the label "layer C" and the node 158 with a label "word H" are contained in the graph 510.

The shortest paths between the plurality of designated words or phrases are illustrated in the graph 510. It is found that the shortest path between "layer A" and "layer B" is the path connecting "layer A" and "layer B" through the complementary word or phrase "layer C." It is found that the shortest path between "layer A" and "device G" is a path directly connecting "layer A" and "device G." It is found that the shortest path between "device G" and "layer B" is a path connecting "device G" and "layer B" through a complementary word or phrase "word H."

Extracted text 520 illustrated in FIG. 6 is a result of extracting sentences from the document on the basis of each shortest path. Here, the description will be given by taking a case where the graph 510 is created by directly connecting tokens contained in the same sentence or paragraph as an example.

It is found from the extracted text 520 that "layer A" and "layer C" are contained in the same sentence in the tenth paragraph and "layer C" and "layer B" are contained in the same sentence in the fifteenth paragraph. The descriptions regarding the designated words or phrases are extracted in this manner, whereby the user can efficiently read and comprehend the document even when the sentences are positioned apart from each other. In the extracted text 520, only sentences containing the designated words or phrases in the paragraphs may be displayed, or all the sentences in the paragraphs containing the designated words or phrases may be displayed.

It is found from the extracted text 520 that "layer A" and "device G" are contained in the same sentence in the thirtieth paragraph. The extraction can be performed regardless of the appearance order of the designated words or phrases in the sentences.

It is found from the extracted text 520 that "layer B" and "word H" are contained in the same sentence in the sixteenth paragraph. Furthermore, it is found that "word H" and "device G" are contained in different sentences in the thirty-eighth paragraph. Thus, even in the case where two words or phrases are contained in different sentences, if the sentences are contained in the same paragraph, more detailed information regarding the designated words or phrases may be presented by extracting both of the sentences. Extracting the descriptions regarding the designated words or phrases enables the user to efficiently read and comprehend the document even when the sentences are positioned apart from each other.

In the case where the sentences extracted as the extracted text 520 contains information such as a drawing, a table, a numerical formula, or a chemical formula, image of the drawing, the table, the numerical formula, the chemical formula, or the like is preferably displayed together. This can further support the user's comprehension of the document. For example, "FIG. X" and "Table Z" illustrated in FIG. 6 or links to the drawing and table are preferably displayed together with the graph 510 and the extracted text 520.

FIG. 7 illustrates an output example of a graph different from those of FIG. 6.

In the example illustrated in FIG. 7, five words or phrases, "layer A," "layer B," "layer C," "layer D," and "layer E" are selected as designated words or phrases.

The graph illustrated in FIG. 7 contains a node 161 to a node 167. "layer A" is a label of the node 161, "layer B" is a label of a node 162, "layer C" is a label of a node 163, "layer D" is a label of a node 164, and "layer E" is a node 165. In addition, a node 166 with a label "word X" and the node 167 with a label "word Y" are contained in the graph.

FIG. 7 illustrates the shortest paths between the designated words or phrases. For example, it is found that the shortest path between "layer A" and "layer B" is a path directly connecting "layer A" and "layer B." Similarly, it is found that the shortest path between "layer A" and "layer C" is a path directly connecting "layer A" and "layer C." It is found that the shortest path between "layer A" and "layer E" is a path connecting "layer A" and "layer E" through the complementary word or phrase "word Y."

In FIG. 7, the node 164 is not connected to the other nodes. This shows a possibility that the description regarding "layer D" is insufficient or an error in writing occurs in the designated document.

Thus, document proofreading can be performed using the graph search result.

It is found that two paths which are a path connecting "layer B" and "layer E" through the designated word or phrase "layer C" and the complementary word or phrase "word Y" and a path connecting "layer B" and "layer E" through the complementary words or phrases "word X" and "word Y" exist as the shortest path between "layer B" and "layer E." In such a case, two shortest paths are illustrated and sentences based on each shortest path can be extracted.

Also in the case where a plurality of documents are designated, graph creation and search are performed in a manner similar to the above, so that a search result can be output. By comparing output results, the user can easily confirm the relatedness and a difference between the plurality of documents.

Furthermore, the graphs illustrating the shortest path between the designated words or phrases, which are the search results, may be vectorized and the degree of similarity between vectors may be calculated; accordingly, the degree of similarity between the plurality of documents may be evaluated and presented to the user.

As described above, the reading comprehension support system of this embodiment presents a graph representing the relatedness between a plurality of designated words or phrases in a document designated by a user, so that document reading and comprehension support can be provided for the user. By extracting and outputting a sentence containing the plurality of designated words or phrases with the system, the user can efficiently read through the document. This allows the user to find necessary information quickly from the document.

This embodiment can be combined with the other embodiments as appropriate. In the case where a plurality of structure examples are described in one embodiment in this specification, the structure examples can be combined as appropriate.

Embodiment 2

In this embodiment, a reading comprehension support system of one embodiment of the Present Invention Will be Described with Reference to FIG. 8 and FIG. 9.

<Reading Comprehension Support System 2>

Figure 8:
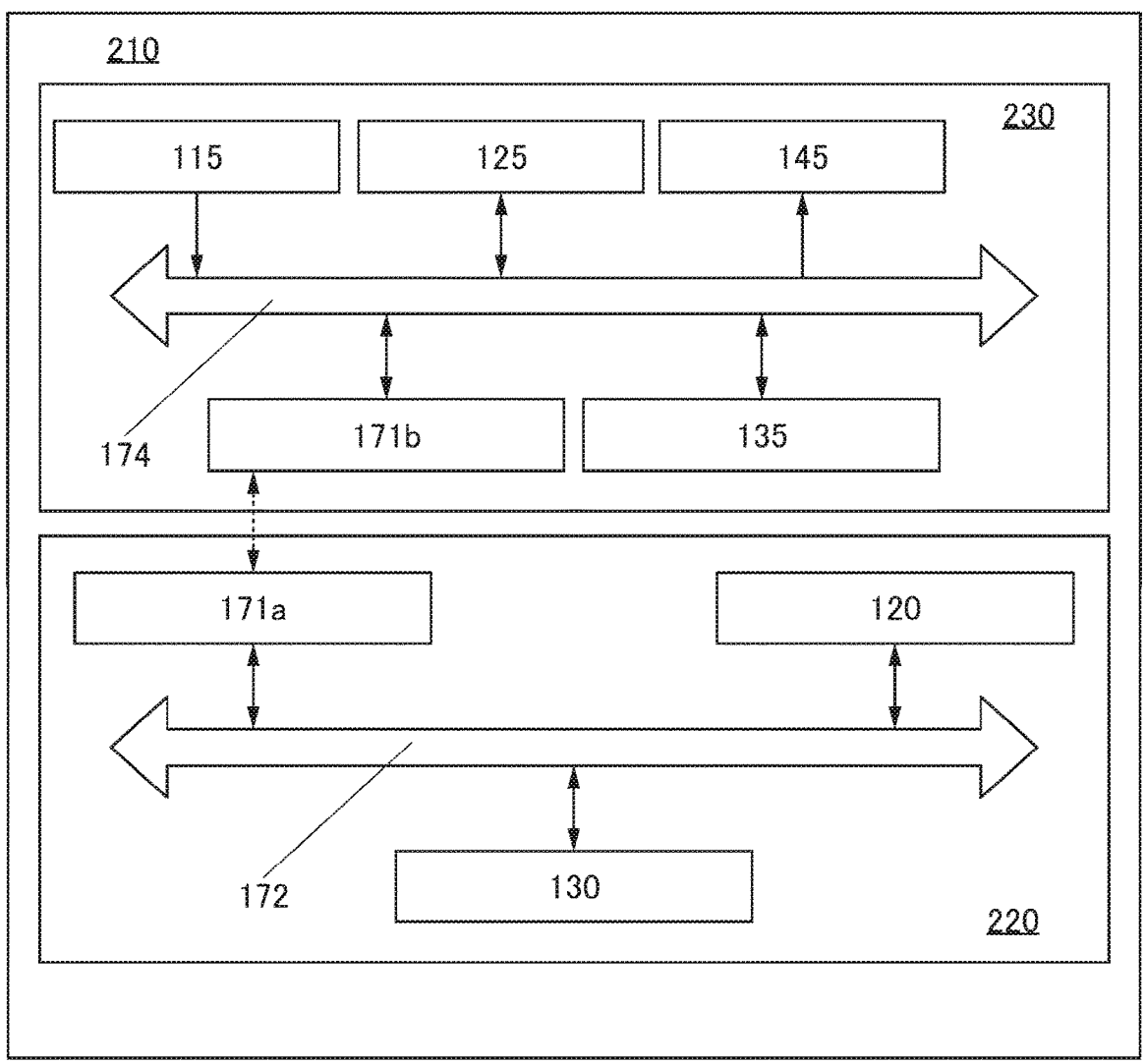
FIG. 8 is a diagram illustrating an example of a reading comprehension support system.

FIG. 8 is a block diagram of a reading comprehension support system 210. The reading comprehension support system 210 includes a server 220 and a terminal 230 (e.g., a personal computer). Note that the description of <Reading comprehension support system 1> in Embodiment 1 can be referred to for the same components as those in the reading comprehension support system 100 shown in FIG. 1.

The server 220 includes a communication portion 171a, a transmission path 172, the storage portion 120, and the processing portion 130. Although not shown in FIG. 8, the server 220 may further include at least one of a reception portion, a database, an output portion, an input portion, and the like.

The terminal 230 includes a communication portion 171b, a transmission path 174, an input portion 115, a storage portion 125, a processing portion 135, and a display portion 145. Examples of the terminal 230 include a tablet personal computer, a laptop personal computer, and various portable information terminals. The terminal 230 may be a desktop personal computer without the display portion 145 and may be connected to a monitor functioning as the display portion 145, or the like.

A user of the reading comprehension support system 210 inputs information about a designated document from the input portion 115 in the terminal 230 to the server 220. The information is transmitted from the communication portion 171b to the communication portion 171a.

For example, text data of the designated document is transmitted from the communication portion 171b to the communication portion 171a. Furthermore, image data of at least one kind selected from a drawing, a chemical formula, a numerical formula, and a table may be transmitted. In addition, for example, document-identifying information is transmitted from the communication portion 171b to the communication portion 171a.

The information received by the communication portion 171a is stored in a memory included in the processing portion 130 or the storage portion 120 via the transmission path 172. The information may be supplied from the communication portion 171a to the processing portion 130 via a reception portion (see the reception portion 110 illustrated in FIG. 1).

Various kinds of processing described in <Reading comprehension support method> in Embodiment 1 are performed in the processing portion 130. These kinds of processing require high processing capacity, and thus are preferably performed in the processing portion 130 included in the server 220. The processing portion 130 preferably has higher processing capacity than the processing portion 135.

A processing result of the processing portion 130 is stored in the memory included in the processing portion 130 or the storage portion 120 via the transmission path 172. After that, the processing result is output from the server 220 to the display portion 145 in the terminal 230. The processing result is transmitted from the communication portion 171a to the communication portion 171b. On the basis of the processing result of the processing portion 130, various kinds of data contained in a database may be transmitted from the communication portion 171a to the communication portion 171b. The processing result may be supplied from the processing portion 130 to the communication portion 171a via an output portion (the output portion 140 illustrated in FIG. 1).

[Communication Portion 171a and Communication Portion 171b]

The server 220 and the terminal 230 can transmit and receive data with the use of the communication portion 171a and the communication portion 171b. As the communication portion 171a and the communication portion 171b, a hub, a router, a modem, or the like can be used. Data may be transmitted or received through wire communication or wireless communication (e.g., radio waves or infrared rays).

[Transmission Path 172 and Transmission Path 174]

The transmission path 172 and the transmission path 174 have a function of transmitting data. The communication portion 171a, the storage portion 120, and the processing portion 130 can transmit and receive data via the transmission path 172. The input portion 171b, the input portion 115, the storage portion 125, the processing portion 135, and the output portion 140 can transmit and receive data via the transmission path 174.

[Input Portion 115]

The input portion 115 can be used when a user designates a document and words or phrases. For example, the input portion 115 can have a function of operating the terminal 230; specific examples thereof include a mouse, a keyboard, a touch panel, a microphone, a scanner, and a camera.

The reading comprehension support system 210 may have a function of converting audio data into text data. For example, at least one of the processing portion 130 and the processing portion 135 may have this function.

The reading comprehension support system 210 may have an optical character recognition (OCR) function. This enables characters contained in image data to be recognized and text data to be created. For example, at least one of the processing portion 130 and the processing portion 135 may have this function.

[Storage Portion 125]

The storage portion 125 may store one or both of the data on the designated document and the data supplied from the server 220. The memory portion 125 may include at least part of the data that can be included in the memory portion 120.

[Processing Portion 130 and Processing Portion 135]

The processing portion 135 has a function of performing arithmetic operation or the like with use of data supplied from the communication portion 171*b*, the storage portion 125, the input portion 115, or the like. The processing portion 135 may have a function of performing at least part of processing that can be performed by the processing portion 130.

Each of the processing portion 130 and the processing portion 135 can include one or both of a transistor including a metal oxide in its channel formation region (OS transistor) and a transistor including silicon in its channel formation region (Si transistor).

In this specification and the like, a transistor including an oxide semiconductor or a metal oxide in a channel formation region is referred to as an oxide semiconductor transistor or an OS transistor. A channel formation region of an OS transistor preferably includes a metal oxide.

In this specification and the like, a metal oxide is an oxide of a metal in a broad sense. Metal oxides are classified into an oxide insulator, an oxide conductor (including a transparent oxide conductor), an oxide semiconductor (also simply referred to as an OS), and the like. For example, in the case where a metal oxide is used in a semiconductor layer of a transistor, the metal oxide is referred to as an oxide semiconductor in some cases. That is to say, in the case where a metal oxide has at least one of an amplifying function, a rectifying function, and a switching function, the metal oxide can be referred to as a metal oxide semiconductor, or OS for short.

The metal oxide included in the channel formation region preferably contains indium (In). When the metal oxide included in the channel formation region is a metal oxide containing indium, the carrier mobility (electron mobility) of the OS transistor is high. The metal oxide included in the channel formation region is preferably an oxide semiconductor containing an element M. The element M is preferably at least one of aluminum (Al), gallium (Ga), and tin (Sn). Other elements that can be used as the element M are boron (B), silicon (Si), titanium (Ti), iron (Fe), nickel (Ni), germanium (Ge), yttrium (Y), zirconium (Zr), molybdenum (Mo), lanthanum (La), cerium (Ce), neodymium (Nd), hafnium (Hf), tantalum (Ta), tungsten (W), and the like. Note that a combination of two or more of the above elements may be used as the element M. The element M is, for example, an element that has high bonding energy with oxygen. The element M is, for example, an element that has higher bonding energy with oxygen than indium. The metal oxide included in the channel formation region is preferably a metal oxide containing zinc (Zn). The metal oxide containing zinc is easily crystallized in some cases.

The metal oxide included in the channel formation region is not limited to the metal oxide containing indium. The semiconductor layer may be a metal oxide that does not contain indium and contains zinc, a metal oxide that does not contain indium and contains gallium, a metal oxide that does not contain indium and contains tin, or the like, e.g., zinc tin oxide or gallium tin oxide.

The processing portion 130 preferably includes an OS transistor. The OS transistor has an extremely low off-state current; therefore, with use of the OS transistor as a switch for retaining electric charge (data) that has flowed into a capacitor functioning as a memory element, a long data retention period can be ensured. When at least one of a register and a cache memory included in the processing portion 130 has such a feature, the processing portion 130 can be operated only when needed, and otherwise can be off while data processed immediately before turning off the processing portion 130 is stored in the memory element. In other words, normally-off computing is possible and the power consumption of the reading comprehension support system can be reduced.

[Display Portion 145]

The display portion 145 has a function of displaying an output result. Examples of the display portion 145 include a liquid crystal display device and a light-emitting display device. Examples of light-emitting elements that can be used in the light-emitting display device include an LED (Light Emitting Diode), an OLED (Organic LED), a QLED (Quantum-dot LED), and a semiconductor laser. It is also possible to use, as the display portion 145, a display device using a MEMS (Micro Electro Mechanical Systems) shutter element, an optical interference type MEMS element, or a display device using a display element employing a microcapsule method, an electrophoretic method, an electrowetting method, an Electronic Liquid Powder (registered trademark) method, or the like, for example.

Figure 9:
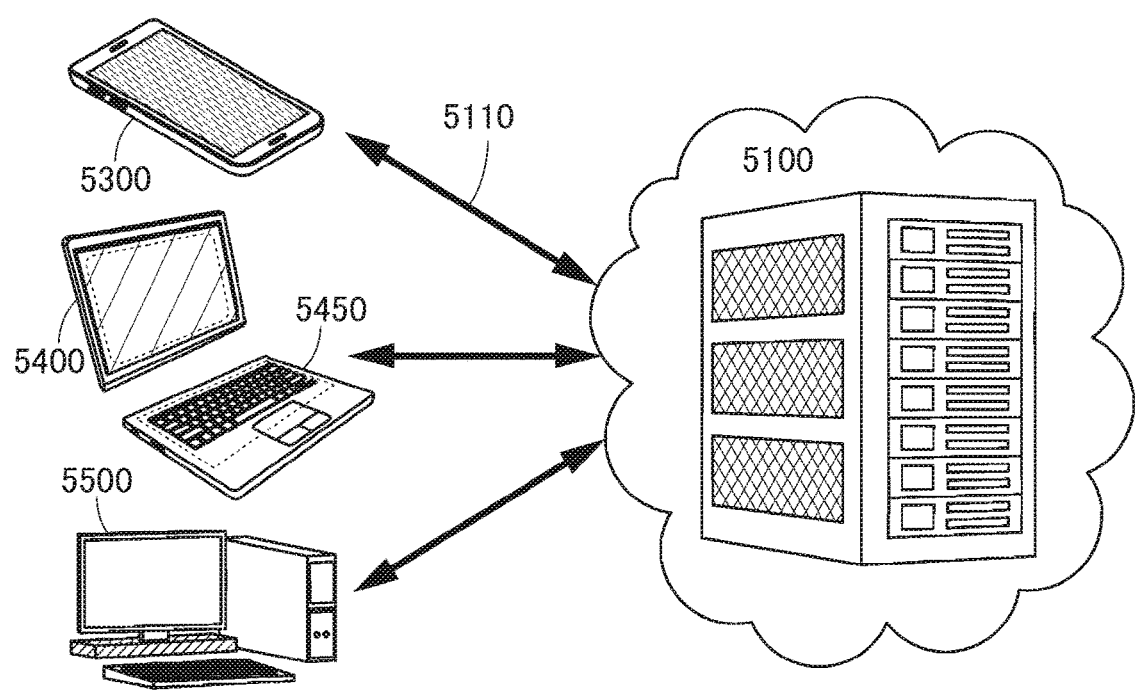
FIG. 9 is a diagram illustrating an example of a reading comprehension support system.

FIG. 9 is a conceptual diagram of the reading comprehension support system of this embodiment.

The reading comprehension support system illustrated in FIG. 9 includes a server 5100 and terminals (also referred to as electronic devices). Communication between the server 5100 and each terminal is conducted via an Internet connection 5110.

The server 5100 is capable of performing arithmetic operation using data input from the terminal via the Internet connection 5110. The server 5100 is capable of transmitting an arithmetic operation result to the terminal via the Internet connection 5110. Accordingly, the burden of arithmetic operation on the terminal can be reduced.

In FIG. 9, an information terminal 5300, an information terminal 5400, and an information terminal 5500 are shown as the terminals. The information terminal 5300 is an example of a portable information terminal such as a smartphone. The information terminal 5400 is an example of a tablet terminal. When the information terminal 5400 is connected to a housing 5450 with a keyboard, the information terminal 5400 can be used as a notebook information terminal. The information terminal 5500 is an example of a desktop information terminal.

With such a structure, a user can access the server 5100 from the information terminal 5300, the information terminal 5400, the information terminal 5500, and the like. Then, through the communication via the Internet connection 5110, the user can receive a service offered by an administrator of the server 5100. Examples of the service include a service with use of the reading comprehension support method of one embodiment of the present invention. In the service, an artificial intelligence may be utilized in the server 5100.

This embodiment can be combined with the other embodiments as appropriate.

REFERENCE NUMERALS

100: reading comprehension support system, 110: reception portion, 115: input portion, 120: storage portion, 125: storage portion, 130: processing portion, 135: processing portion, 140: output portion, 145: display portion, 150: transmission path, 151: node, 152: node, 153: node, 154: node, 155: node, 156: node, 157: node, 158: node, 159: label, 160: label, 161: node, 162: node, 163: node, 164: node, 165: node, 166: node, 167: node, 171*a*: communication portion, 171*b*: communication portion, 172: transmission path, 174: transmission path, 210: reading comprehension support system, 220: server, 230: terminal, 300:

sentence, 301: token, 302: token, 303: token, 304: token, 305: token, 306: token, 307: token, 308: token, 309: token, 310: token, 311: token, 312: token, 321: token, 322: token, 323: node, 324: node, 325: label, 330a: sentence, 330: sentence, 331: token, 332: token, 333: token, 334: token, 335: token, 336: token, 337: token, 338: token, 339: token, 340: token, 341: token, 342: token, 351: token, 352: token, 353: token, 354: node, 355: node, 356: node, 357: label, 358: label, 510: graph, 520: extracted text, 5100: server, 5110: Internet connection, 5300: information terminal, 5400: information terminal, 5450: housing, 5500: information terminal

The invention claimed is:

1. A reading comprehension support system comprising:
 a reception portion comprising at least one of a mouse, a keyboard, a touch panel, a microphone, a scanner, and a camera;
 a processing portion comprising an arithmetic circuit; and a display device,
 wherein the reception portion is configured to receive a designated document and receive a plurality of designated words or phrases,
 wherein the processing portion is configured to create a first graph representing a structure of the designated document with words or phrases contained in the designated document,
 wherein, in a case where two words or phrases exist in same paragraphs in the designated document, the processing portion is configured to connect the two words or phrases in the first graph,
 wherein the processing portion is configured to search the first graph with the plurality of designated words or phrases and create a second graph representing a shortest path between any two of the plurality of designated words or phrases in the first graph,
 wherein the display device is configured to display the first graph and the second graph, and
 wherein the plurality of designated words or phrases is at least part of the plurality of words or phrases contained in the first graph.

2. The reading comprehension support system according to claim 1,
 wherein the display device is configured to display a sentence containing the designated word or phrase in a paragraph containing the plurality of designated words or phrases in the designated document.

3. The reading comprehension support system according to claim 1,
 wherein the shortest path is a path connecting any two of the plurality of designated words or phrases through at least one complementary word or phrase, and
 wherein the complementary word or phrase is a word or phrase different from the plurality of designated words or phrases.

4. The reading comprehension support system according to claim 3,
 wherein the display device is configured to display a sentence containing at least one of the designated word or phrase and the complementary word or phrase in a paragraph containing at least one of the plurality of designated words or phrases and at least one of the complementary words or phrases in the designated document.

5. The reading comprehension support system according to claim 1,
 wherein the display device displays at least the second graph representing shortest paths between the plurality of designated words or phrases in the first graph.

6. The reading comprehension support system according to claim 5,
 wherein the display device is configured to display a sentence containing the designated word or phrase in a paragraph containing the plurality of designated words or phrases in the designated document.

7. The reading comprehension support system according to claim 6,
 wherein the shortest paths connecting any two of the plurality of designated words or phrases are paths connecting the two designated words or phrases through at least one complementary word or phrase, and
 wherein the complementary word or phrase is a word or phrase different from the plurality of designated words or phrases.

8. The reading comprehension support system according to claim 7,
 wherein the display device is configured to display a sentence containing at least one of the designated word or phrase and the complementary word or phrase in a paragraph containing at least one of the plurality of designated words or phrases and at least one of the complementary words or phrases in the designated document.

9. The reading comprehension support system according to claim 1, further comprising a storage portion comprising a nonvolatile memory,
 wherein the storage portion is configured to store the first graph and the second graph.

10. The reading comprehension support system according to claim 1,
 wherein the processing portion is configured to create a third graph representing a structure of the designated document with abstraction of the words or phrases contained in the designated document.

11. The reading comprehension support system according to claim 10,
 wherein the abstraction of the words or phrases refers to replacement of the words or phrases by a representative word, and
 wherein the representative word is configured to be obtained by classification by machine learning.

12. A reading comprehension support method comprising:
 receiving a designated document;
 creating a first graph representing a structure of the designated document with words or phrases contained in the designated document;
 outputting two or more words or phrases contained in the first graph;
 receiving a plurality of designated words or phrases from the output words or phrases;
 searching the first graph with the plurality of designated words or phrases;
 creating a second graph representing a shortest path between any two of the designated words or phrases in the first graph; and
 displaying the first graph and the second graph,
 wherein, in a case where two words or phrases exist in same paragraphs in the designated document, connecting the two words or phrases in the first graph.

13. The reading comprehension support method according to claim 11, wherein a sentence containing the designated word or phrase in a paragraph containing the plurality of designated words or phrases in the designated document is displayed together with the second graph.

14. The reading comprehension support method according to claim 11,
wherein the shortest path is a path connecting any two of the plurality of designated words or phrases through at least one complementary word or phrase, and
wherein the complementary word or phrase is a word or phrase different from the plurality of designated words or phrases.

15. The reading comprehension support method according to claim 14,
wherein a sentence containing at least one of the designated word or phrase and the complementary word or phrase in a paragraph containing at least one of the plurality of designated words or phrases and at least one of the complementary words or phrases in the designated document is displayed together with the second graph.

16. The reading comprehension support method according to claim 11,
wherein the displayed second graph represents at least shortest paths between the plurality of designated words or phrases in the first graph is output.

17. The reading comprehension support method according to claim 16,
wherein a sentence containing the designated word or phrase in a paragraph containing the plurality of designated words or phrases in the designated document is displayed together with the second graph.

18. The reading comprehension support system according to claim 16,
wherein the shortest paths connecting any two of the plurality of designated words or phrases are paths connecting the two designated words or phrases through at least one complementary word or phrase, and
wherein the complementary word or phrase is a word or phrase different from the plurality of designated words or phrases.

19. The reading comprehension support method according to claim 18,
wherein a sentence containing at least one of the designated word or phrase and the complementary word or phrase in a paragraph containing at least one of the plurality of designated words or phrases and at least one of the complementary words or phrases in the designated document is displayed together with the second graph.

20. The reading comprehension support method according to claim 12, further comprising:
creating a third graph representing a structure of the designated document with abstraction of the words or phrases contained in the designated document.

21. The reading comprehension support system according to claim 10,
wherein the abstraction of the words or phrases refers to replacement of the words or phrases by a hypernym.

* * * * *